United States Patent
DeKoning et al.

(10) Patent No.: US 10,620,843 B2
(45) Date of Patent: Apr. 14, 2020

(54) METHODS FOR MANAGING DISTRIBUTED SNAPSHOT FOR LOW LATENCY STORAGE AND DEVICES THEREOF

(71) Applicant: NetApp, Inc., Sunnyvale, CA (US)

(72) Inventors: Rodney A. DeKoning, Wichita, KS (US); Tim Emami, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/659,886

(22) Filed: Jul. 26, 2017

(65) Prior Publication Data

US 2019/0034092 A1    Jan. 31, 2019

(51) Int. Cl.
*G06F 3/06* (2006.01)
*G06F 16/11* (2019.01)

(52) U.S. Cl.
CPC .......... *G06F 3/0611* (2013.01); *G06F 3/065* (2013.01); *G06F 3/067* (2013.01); *G06F 3/0619* (2013.01); *G06F 3/0665* (2013.01); *G06F 3/0679* (2013.01); *G06F 3/0689* (2013.01); *G06F 16/119* (2019.01); *G06F 16/128* (2019.01)

(58) Field of Classification Search
CPC ...... G06F 3/0611; G06F 3/0619; G06F 3/067; G06F 3/0665; G06F 16/119; G06F 16/128; G06F 3/065; G06F 3/0679; G06F 3/0689; G06F 17/30079; G06F 17/30088
USPC ........................................................ 711/103
See application file for complete search history.

(56) References Cited

U.S. PATENT DOCUMENTS

| | | | |
|---|---|---|---|
| 7,430,568 B1 | 9/2008 | DeKoning et al. | |
| 8,250,035 B1* | 8/2012 | Tang | G06F 17/30088 |
| | | | 707/639 |
| 10,489,518 B1* | 11/2019 | Ramachandran | G06F 16/128 |
| 2004/0167972 A1* | 8/2004 | Demmon | G06F 11/1464 |
| | | | 709/219 |
| 2005/0193245 A1* | 9/2005 | Hayden | G06F 11/2069 |
| | | | 714/13 |
| 2007/0185973 A1* | 8/2007 | Wayda | G06F 3/0607 |
| | | | 709/217 |
| 2010/0042791 A1* | 2/2010 | Helman | G06F 11/1435 |
| | | | 711/162 |
| 2010/0131727 A1* | 5/2010 | Eguchi | G06F 11/1466 |
| | | | 711/162 |

(Continued)

FOREIGN PATENT DOCUMENTS

WO    2017091570 A1    6/2017

OTHER PUBLICATIONS

International Search Report and Written Opinion for PCT/US2018/029743 (dated Jul. 31, 2018).

*Primary Examiner* — Yaima Rigol
(74) *Attorney, Agent, or Firm* — Pepper Hamilton LLP

(57) ABSTRACT

Methods, non-transitory computer readable media, and computing devices that manages distributed snapshot for low latency storage includes accessing one or more snapshots from one or more solid state devices (SSD), wherein the obtained one or more snapshots are stored in a snapshot allocated capacity of the one or more SSD. A data transfer operation is initiated from a primary storage to a secondary storage using the accessed one or more snapshots. It is determined if the initiated data transfer operation is completed and when it is determined to be completed, the obtained one or more snapshots stored in the snapshot allocated capacity of the one or more SSD are deleted.

18 Claims, 4 Drawing Sheets

(56) References Cited

U.S. PATENT DOCUMENTS

| | | | |
|---|---|---|---|
| 2013/0332656 A1* | 12/2013 | Kandiraju | G06F 17/30218 711/103 |
| 2014/0244935 A1* | 8/2014 | Ezra | G06F 3/0614 711/133 |
| 2014/0344216 A1* | 11/2014 | Abercrombie | G06F 17/30575 707/609 |
| 2015/0067231 A1* | 3/2015 | Sundarrajan | G06F 3/065 711/103 |
| 2016/0196186 A1* | 7/2016 | Yang | G06F 11/1451 711/162 |
| 2016/0306552 A1* | 10/2016 | Liu | G06F 3/061 |
| 2016/0357443 A1* | 12/2016 | Li | G06F 3/065 |
| 2017/0031772 A1 | 2/2017 | Subramanian et al. | |
| 2017/0154093 A1 | 6/2017 | Shetty et al. | |
| 2017/0185491 A1 | 6/2017 | Hajare et al. | |
| 2018/0137014 A1* | 5/2018 | Li | G06F 11/1458 |

* cited by examiner

METHODS FOR MANAGING DISTRIBUTED SNAPSHOT FOR LOW LATENCY STORAGE AND DEVICES THEREOF

FIELD

This technology relates to managing distributed snapshot for low latency storage.

BACKGROUND

As high performance storage class memory SSD become available, it becomes increasingly difficult to provide high level storage functions with high levels of data management (snapshot in particular) at the required latency levels due to the amount of overhead associated with managing the snapshots. Typical overheads for systems in the existing technologies deploy advanced data management features such as snapshots in the 10-100 microsecond range. However, adding these latencies to low latency SSDs significantly reduces the performance of the storage systems.

DETAILED DESCRIPTION

Figure 1:
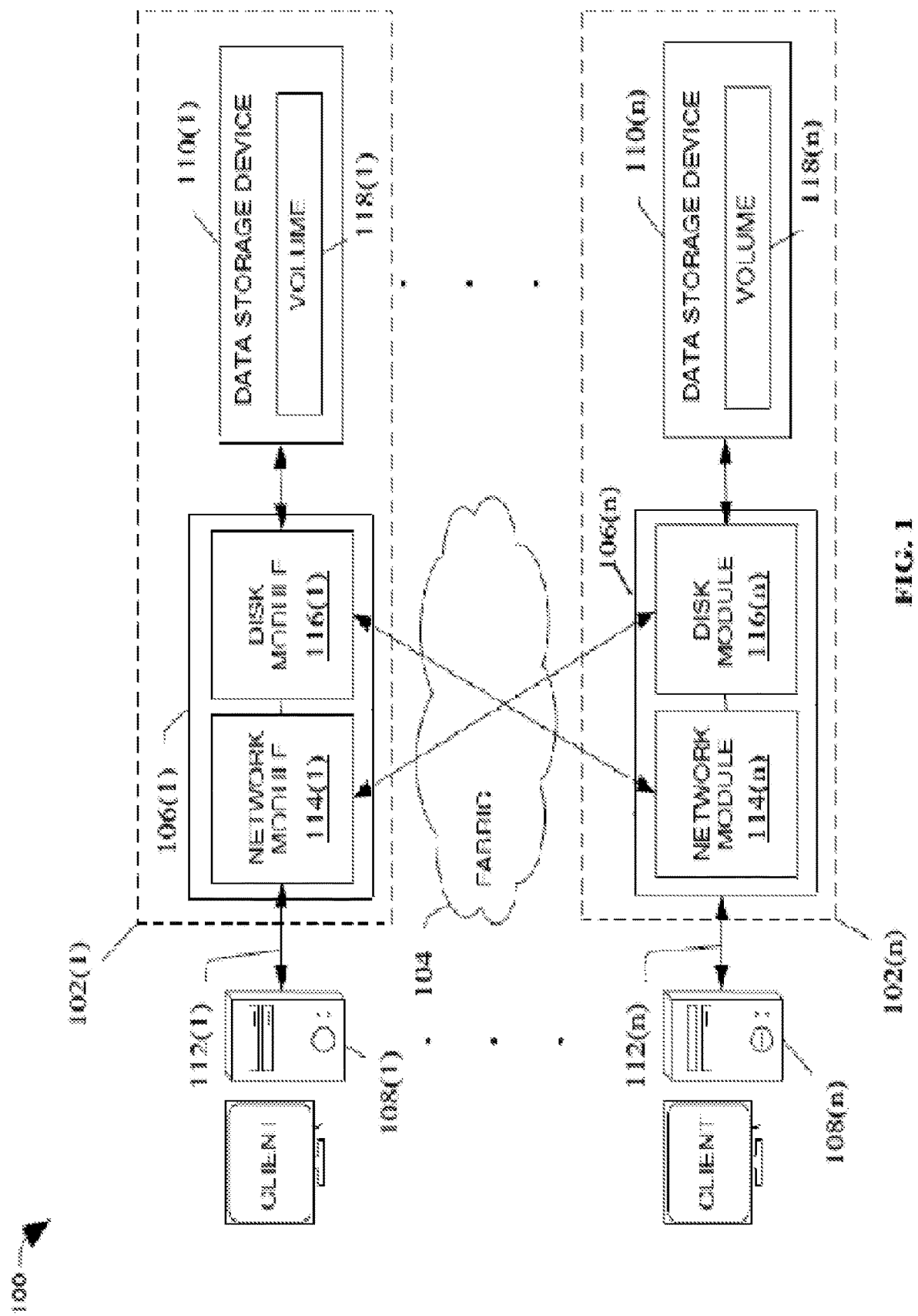
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example, although any number of other elements or components can also be included in the clustered network environment 100 in other examples. This technology provides a number of advantages including methods, non-transitory computer readable media, and devices that allow managing distributed snapshot for low latency storage.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers)

to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI, FCP, SAS, NVMe, NVMe-oF for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) and server devices 109(1)-109(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, SSDs, storage class memories and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
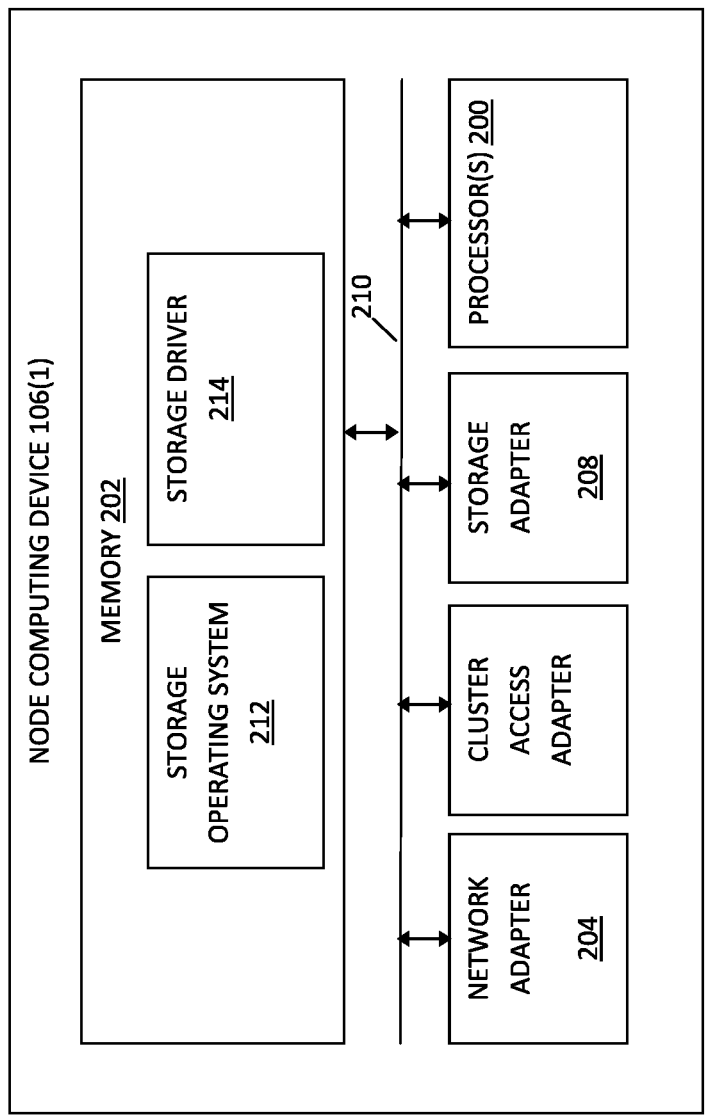
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIG. 3, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, SSDs, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIG. 3.

Figure 3:
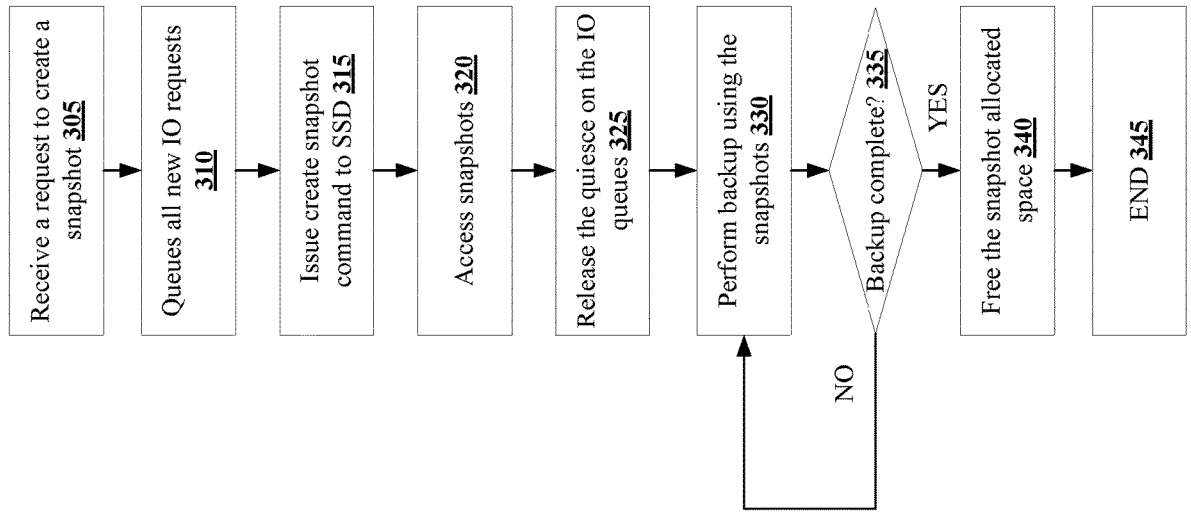
FIG. 3 is a flowchart of an exemplary method for managing distributed snapshot for low latency storage.
Figure 4:
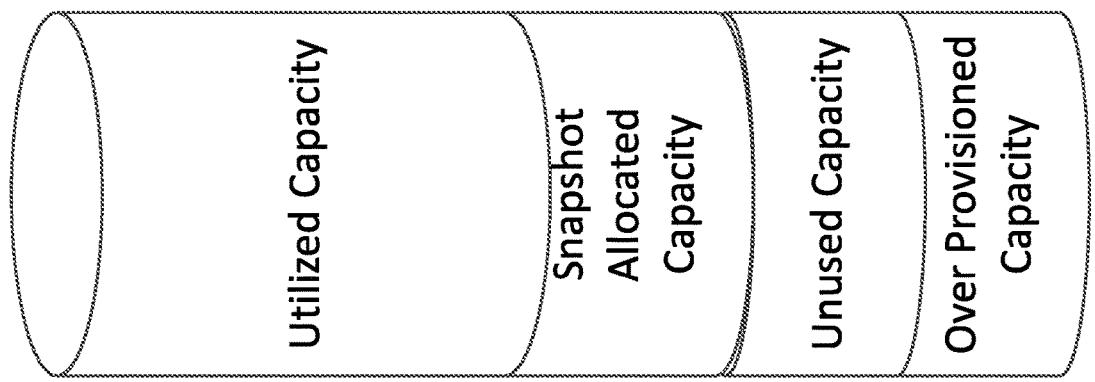
FIG. 4 is an exemplary block diagram of a logical view of a SSD.

Referring to FIGS. 3-4, an exemplary method for managing distributed snapshots for low latency storage will now be described. In step 305 in this example, the node computing device 106(1) receives a request to create a snapshot of the primary and the secondary storage, wherein the primary and the secondary storage includes include primary and secondary solid state devices (SSDs), respectively, although the node computing device 106(1) can receive other types or number of requests. In this example, the node computing device 106(1) receives the request to create the snapshot when it is determined that a point in time snapshot image is required to allow a full data or a delta update to be made from the primary storage to the secondary storage, although the request for the snapshot can be received at other instances. Alternatively, the node computing device 106(1) can determine when it is time or advantageous to move the data to another tier in the storage hierarchy and can automatically generate the request for the snapshot.

Next in step 310, the node computing device 106(1) quiesces the associated logical volumes requiring the snapshot creation on both the primary storage and the secondary storage. In this example, to quiesce the logical volumes, the node computing device 106(1) queues all the new input/output requests and allowing allows all outstanding input/output requests to be completed for all associated LBA extents to all involved SSDs, although quiescing can include other types of operations that are necessary to create a snapshot.

In step 315, the node computing device 106(1) issues a command to create a snapshot to all the SSDs present in both the primary and the secondary storage that is involved with the specified aggregates or volumes, although the node computing device 106(1) can issue a request to create the snapshot to other types of storage devices in the primary and the secondary storages. In this example, the command to create the snapshot includes the addressing technique to be used to access the snapshot entity on each of the SSDs, although the request can include other types or amounts of information to assist each of the SSDs to create a snapshot. Additionally in this example, each of the SSDs using a respective flash translation layer (FTL) creates a snapshot allocated capacity as a response to the request and maintains the old data in that region, although other types or amounts of data can be stored or cached in the snapshot allocated capacity. In this example, the snapshot allocated capacity as illustrated in FIG. 4 is a virtual region, although the snapshot allocated capacity can be a physical partition in other examples. The FTL presents a primary LUN to the host (i.e., the node computing device 106(1)) by presenting the LBA extents that have been written, along with the LBA extents that has not been written. Further, the SSD FTL utilizes the over provisioned capacity and the unused capacity in the logical division of the SSD to allow efficient management of the flash media when writes and data scrubs of the SSD are required. Additionally, the SSD FTL also presents to the host a second snapshot LUN that provides data to the host reflected at the time the snapshot is going to be created. Once the snapshot allocated capacity is created, each of the SSDs creates a snapshot and stores the snapshot in the created snapshot allocated capacity space, although the snapshot can be stored at other memory locations.

Next in step 320, the node computing device 106(1) acquires the access point for the new snapshot volume provided by each of the SSDs, although the node computing device 106(1) can access the snapshots using other techniques.

In step 325, the node computing device 106(1) performs a quiesce release operation by releasing the input/output queues that were being held in step 310. In this example, by releasing the input/output queues, all the new input/output operations can resume the operations on the primary and the secondary storage.

Next in step 330, the node computing device 106(1) utilizes the snapshots accessed from the SSDs to perform the full backup or the delta backup from the primary storage to the secondary storage, although the node computing device 106(1) can use other types or amounts of information while performing the data backup. In this example, node computing device 106(1) moves data from the snapshot LUN presented by the primary storage to the original LUN on the secondary storage provided by the secondary storage volume. This data movement is done by reading some appropriate number of LBA extents from the snapshot LUN on the primary storage volume and writing these same LBA extents to the original LUN on the secondary storage volume, although other techniques can be used to complete the backup of the data from the primary storage to the secondary storage. Additionally in this example, writing is completed to the original LUN on the secondary storage to allow the secondary storage to continue to access the original LUNs during the update. In this example, the snapshot is accessed by the local application as required and the data that is being copied or updated is written to the original remote volume. Once the original LUN has been updated by the backup operation, the secondary storage will typically delete the snapshot LUN and access the now updated original LUN. Additionally in this example, all LBA reads to the original LUN are performed using normal FTL function with the original LUN's metadata from the utilized capacity region illustrated in FIG. 4. With respect to writes to the original LUN, for the extents that have not been written, the SSD's FTL allocates data from the unused or over provisioned capacity regions and writes the new data to this allocated capacity. The original LUN's metadata is updated by the SSD's FTL to reflect this new LBA extent in the original LUN's metadata. Furthermore, the SSD's FTL updates the snapshot LUN's metadata reflecting the previous LBA extent. The LBA extents that have been written previously, and are located in the utilized capacity region illustrated in FIG. 4, are simply updated per normal FTL function for the original LUN and there is no impact to the snapshot LUN.

With respect to the snapshot LUN, the reads to the snapshot LUN are provided using the following technique: each of the LBA extents associated with the original LUN that has not been written since the point in time (PIT) snapshot was created is read from the utilized capacity region. Each of the LBA extents that has been written since the PIT snapshot was created, is read from the snapshot allocated capacity region. With respect to the writes to the snapshot LUN, for extents that have not been written the SSD's FTL allocates data from the unused or over provisioned capacity regions and writes the new data to this allocated capacity. In this example, the new data is associated with or is part of the snapshot allocation capacity region. The snapshot LUN's metadata is updated by the SSD's FTL to reflect this new LBA extent in the snapshot LUN's metadata. Furthermore, each of the LBA extents that has been written previously to the original LUN indicates that the snapshot LUN's LBA extent already exists in the snapshot allocated capacity and is updated per normal FTL function operating on the snapshot LUN's metadata within the snapshot allocated capacity region illustrated in FIG. 4.

In step 335, the node computing device 106(1) determines when the data backup is complete. In this example, the data backup is complete when either the full data or the delta data has been completely transferred from the primary storage to the secondary storage. Accordingly, when the node computing device 106(1) determines that the data backup is not complete, a No branch is taken back to step 330. However, when the node computing device 106(1) determines that the data backup is complete, then the Yes branch is taken to step 340.

In step 340, the node computing device 106(1) deletes the snapshot that was stored in the snapshot allocated capacity of the SSDs to free up the snapshot allocated capacity in the SSDs and the exemplary method ends in step 345. With this technology, normal snapshot processing can be accelerated by using low latency SSDs.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method, comprising:
accessing, by a computing device, snapshots from solid state devices (SSDs), wherein each of the accessed snapshots is assigned a logical unit number (LUN) and stored in an allocated virtual region of a respective one of the SSDs;
initiating, by the computing device, a data transfer operation from a primary storage to a secondary storage using the accessed snapshots; and
deleting, by the computing device, the accessed snapshots from the SSDs when the initiated data transfer operation is determined to be completed.

2. The method as set forth in claim 1, wherein the data transfer operation is initiated for a volume of the primary storage that spans the SSDs.

3. The method as set forth in claim 1, further comprising issuing, by the computing device, a create snapshot request to each of the SSDs in the primary storage and the secondary storage.

4. The method as set forth in claim 1, further comprising releasing, by the computing device, the quiesce on the input/output operations when the initiated data transfer operation is determined to be completed, wherein the quiesce was initiated prior to creating the snapshots.

5. The method as set forth in claim 1, wherein the accessed snapshots are captured by the SSDs at a consistent point in time.

6. The method as set forth in claim 1, writing, by the computing device, data associated with a received write request to allocated capacity of an over-provisioned region of another one of the SSDs, wherein the allocated virtual region is updated to include the allocated capacity.

7. A non-transitory machine readable medium having stored thereon instructions for managing distributed snapshots for low latency storage comprising machine executable code which when executed by at least one machine causes the machine to:
access snapshots from solid state devices (SSDs), wherein each of the accessed snapshots is assigned a logical unit number (LUN) and stored in an allocated virtual region of a respective one of the SSDs;
initiate a data transfer operation from a primary storage to a secondary storage using the accessed snapshots;
delete the accessed snapshots stored in the snapshot allocated capacity of the SSDs when the initiated data transfer operation is determined to be completed.

8. The medium as set forth in claim 7, wherein the data transfer operation is initiated for a volume of the primary storage that spans the SSDs.

9. The medium as set forth in claim 7, wherein the machine executable code, when executed by the machine, further causes the machine to issue a create snapshot request to each of the SSDs in the primary storage and the secondary storage.

10. The medium as set forth in claim 7, wherein the machine executable code, when executed by the machine, further causes the machine to release the quiesce on the input/output operations when the initiated data transfer operation is determined to be completed, wherein the quiesce was initiated prior to creating the snapshots.

11. The medium as set forth in claim 7, wherein the accessed snapshots are captured by the SSDs at a consistent point in time.

12. The medium as set forth in claim 7, wherein the machine executable code, when executed by the machine, further causes the machine to write data associated with a received write request to allocated capacity of an over-provisioned region of another one of the SSDs, wherein the allocated virtual region is updated to include the allocated capacity.

13. A computing device, comprising:
a memory containing machine readable medium comprising machine executable code having stored thereon instructions for managing distributed snapshots for low latency storage; and
a processor coupled to the memory, the processor configured to execute the machine executable code to cause the processor to:
access snapshots from solid state devices (SSDs), wherein each of the accessed snapshots is assigned a logical unit number (LUN) and stored in an allocated virtual region of a respective one of the SSDs;
initiate a data transfer operation from a primary storage to a secondary storage using the accessed snapshots; and
delete the accessed snapshots stored in the snapshot allocated capacity of the SSDs when the initiated data transfer operation is determined to be completed.

14. The computing device as set forth in claim 13, wherein the data transfer operation is initiated for a volume of the primary storage that spans the SSDs.

15. The computing device as set forth in claim 13, wherein the processor is further configured to execute the machine executable code to further cause the processor to issue a create snapshot request to each of the SSDs in the primary storage and the secondary storage.

16. The computing device as set forth in claim wherein the processor is further configured to execute the machine executable code to further cause the processor to release the quiesce on the input/output operations when the initiated data transfer operation is determined to be completed, wherein the quiesce was initiated prior to creating the snapshots.

17. The computing device as set forth in claim 13, wherein the accessed snapshots are captured by the SSDs at a consistent point in time.

18. The computing device as set forth in claim 13, wherein the processor is further configured to execute the machine executable code to further cause the processor to write data associated with a received write request to allocated capacity of an over-provisioned region of another one of the SSDs, wherein the allocated virtual region is updated to include the allocated capacity.

* * * * *